March 5, 1963
R. D. JOHNSON ETAL
3,080,173
TANK TRUCK ASSEMBLY
Filed June 29, 1960
3 Sheets-Sheet 1
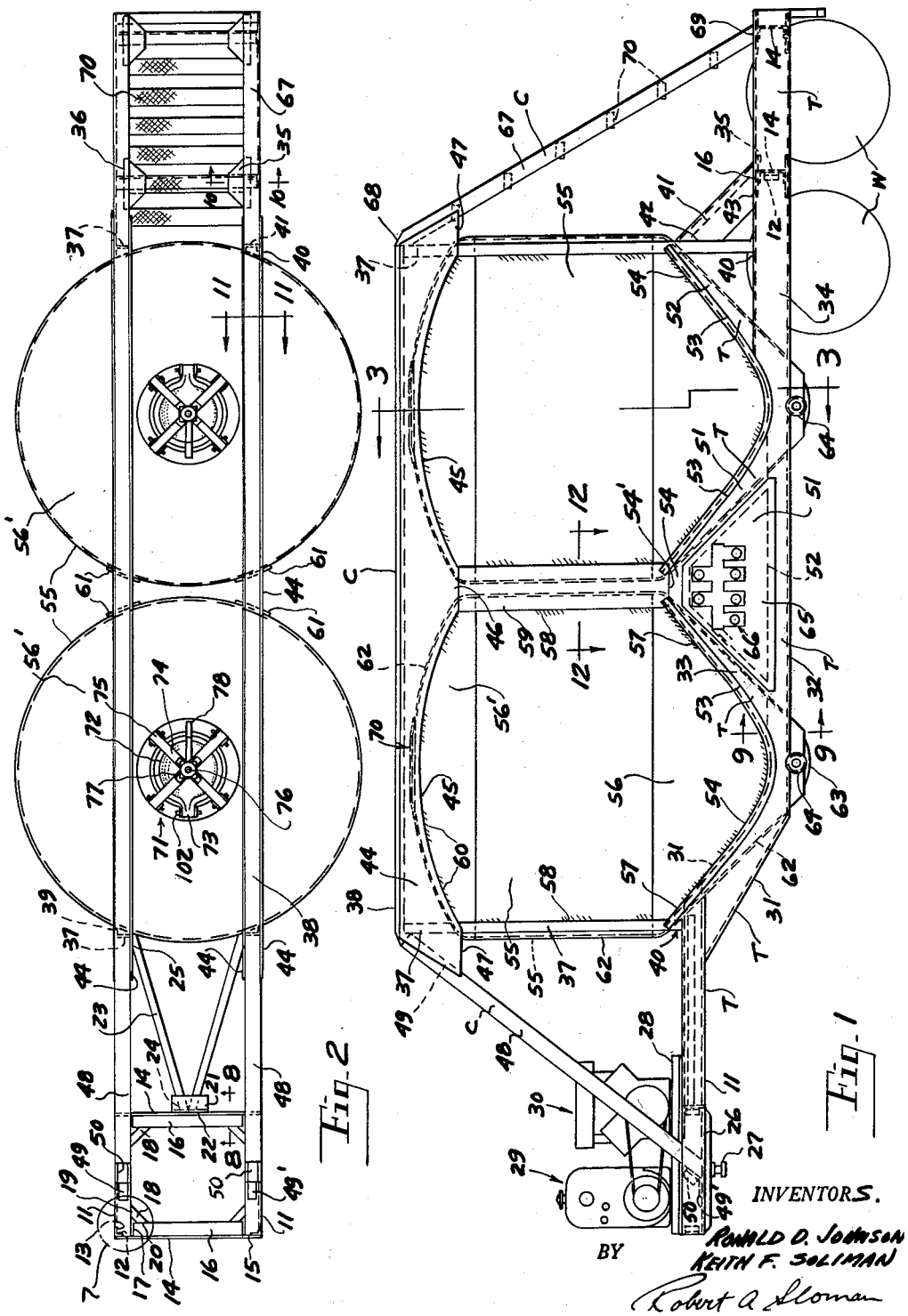
INVENTORS.
RONALD O. JOHNSON
KEITH F. SOLIMAN
BY
Robert A. Sloman
ATTORNEY

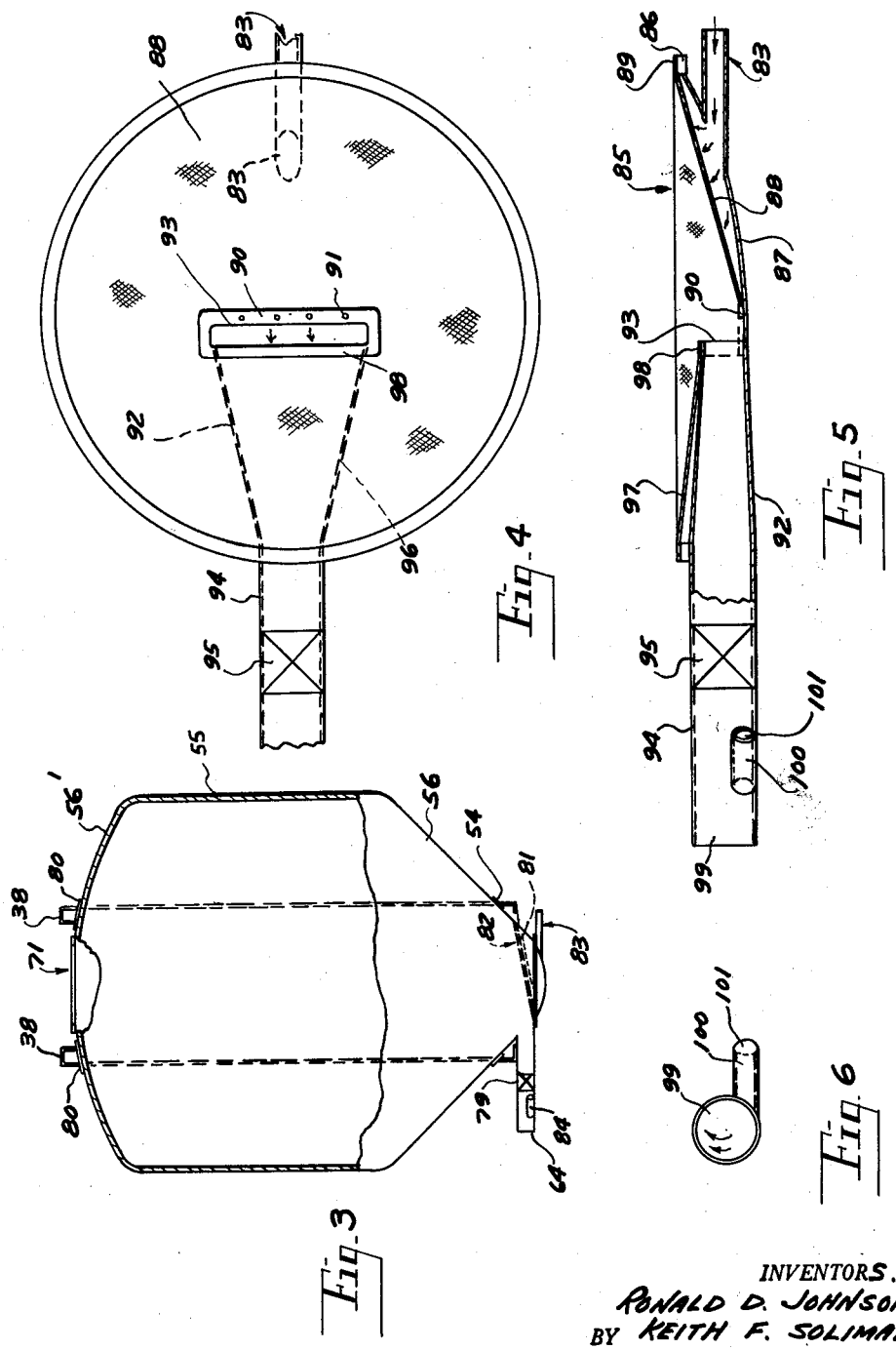

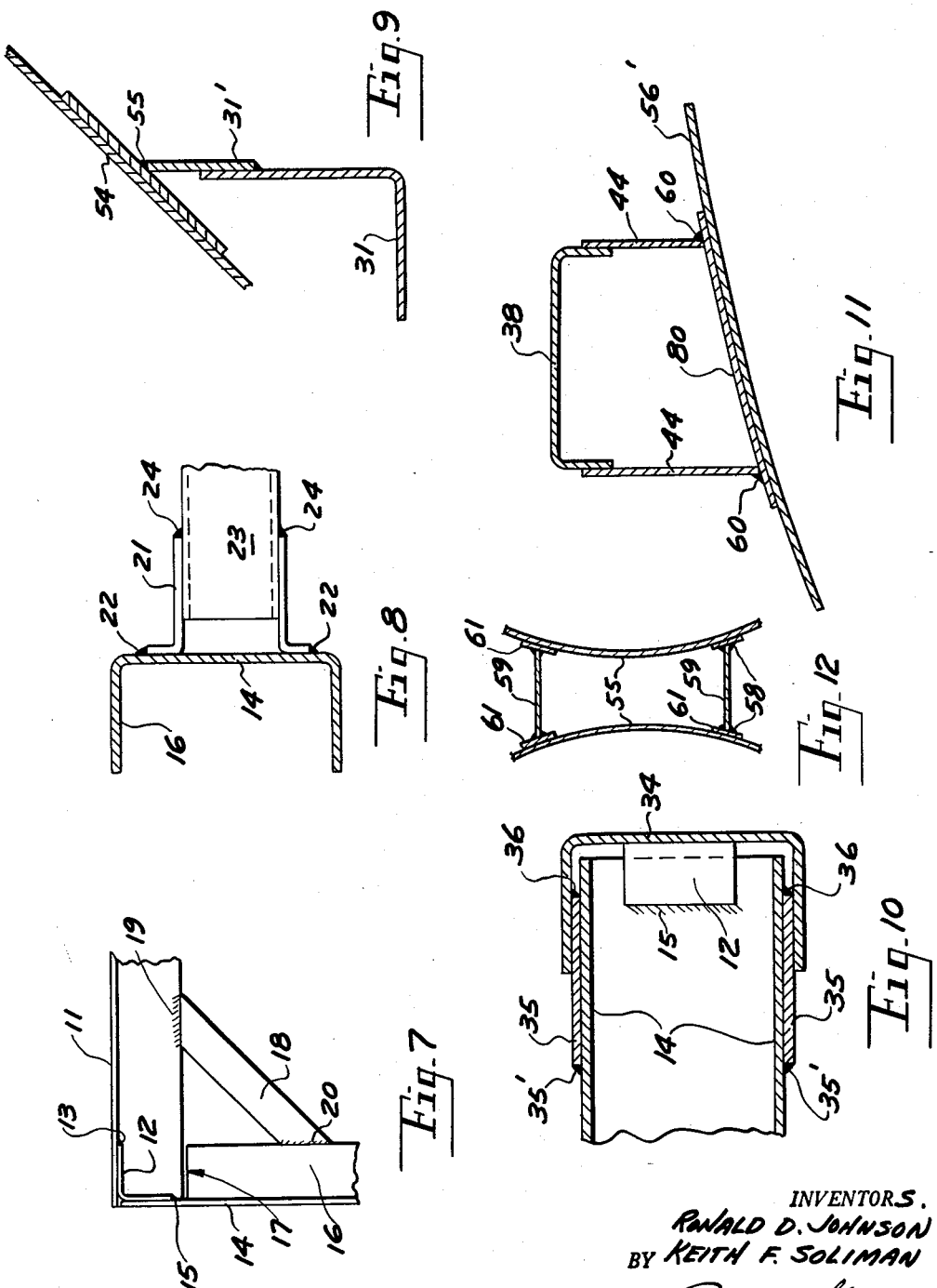

3,080,173
TANK TRUCK ASSEMBLY
Ronald D. Johnson and Keith F. Soliman, Detroit, Mich.; said Soliman assignor to said Johnson
Filed June 29, 1960, Ser. No. 39,593
2 Claims. (Cl. 280—5)

This invention relates to a tank truck assembly, and more particularly to an assembly of this type wherein the tanks are integrated within and secured to and form a part of the truck framework.

It is the object of the present invention to provide a tank truck assembly wherein the tanks employed are arranged substantially within, upon, secured to and integrated with respect to the vehicle framework to thus provide an integral unit, namely a solid integrated structure.

It is a further object to provide in a tank truck assembly, a framework encompassing and supporting and having secured thereto a series for upright tanks to thus form an integral truss assembly capable of taking compression, tension and shear forces and eliminating such stresses from the tanks themselves.

It is a further object to provide a novel form of aerator for the tanks forming a part of the tank truck assembly.

It is a further object to provide a tank truck assembly wherein the truss arrangement provided in mounting the tanks within and securing the same to the framework permits vertical tanks which are clean inside with no struts or trusses upon their interior to thus provided a more efficient tank assembly.

These and other objects will be seen from the following specification and claims in conjunction with the appended drawings in which:

FIG. 1 is a side elevational view of a frame and tank arrangement for the truck assembly.

FIG. 2 is a plan view thereof.

FIG. 3 is a section taken on line 3—3 of FIG. 1.

FIG. 4 is a fragmentary plan view of a slightly different form of aerator construction for the tanks.

FIG. 5 is a longitudinal section thereof.

FIG. 6 is a left end view of the outlet thereof.

FIG. 7 is a fragmentary plan view of the front portion of the frame assembly indicated in dotted lines at 7 in FIG. 2, on an increased scale for clarity.

FIG. 8 is a fragmentary section taken on line 8—8 of FIG. 2.

FIG. 9 is a fragmentary section taken on line 9—9 of FIG. 1.

FIG. 10 is a fragmentary section taken on line 10—10 of FIG. 2.

FIG. 11 is a fragmentary section taken on line 11—11 of FIG. 2, and FIG. 12 is a similar section taken on line 12—12 of FIG. 1.

It will be understood that the above drawings illustrate merely a preferred embodiment of the invention and that other embodiments are contemplated within the scope of the claims hereafter set forth.

Referring to the drawings, and particularly FIGS. 1 and 2, the framework for the present tank truck is substantially parallel throughout its length with the two upright tanks positioned within the framework and fixedly secured thereto as an integral part, as will be hereafter described.

The present framework includes the opposed pair of elongated front channels 11 with interconnected cross-bracing U shaped channel 14, also shown in more detail in FIG. 7. To accomplish this assembly, angle members 12 are employed, secured as by welding at 13 to internal portions of the web of the respective channels 11.

In this connection it is noted that the crossbraces 14 are not directly connected to the channels 11, but on the other hand are secured thereto by the intermediate angle members 12, being welded thereto at 15, FIG. 7. The assembly is completed by the angular braces 18 secured as by welds at 19 to channels 11 respectively and as by welds 20 to the members 16 forming a part of the cross channel 14. In this connection, it is noted that the members 16 are partly cutaway so as to be spaced from the side channels 11 as indicated at 17 in the preferred construction.

A second cross channel 14 is interposed between side channels 11 and is likewise secured to the side channels 11 in the same manner as above described in connection with the first cross channel 14.

A further reinforcing structure between the channels 11 is shown particularly in FIGS. 2 and 8 which includes the angular braces 23 which extend into the short channel 21 suitably secured as by the welds 22 to the outside wall of the cross channel 14. The braces 23 are secured adjacent their one ends as by the welds 24 to the channel element 21, and at their opposite ends are secured to the side channels 11 as at 25, FIG. 2.

Below the reinforced front end of the frame structure defined by the channels 11 and 14 there is provided a conventional kingpin plate 26 with depending kingpin 27 by which the trailer portion of the tank truck is connected to a tractor in a conventional manner. Arranged directly above the said framework is the mounting plate 28 suitably secured thereto and carrying the conventional motor 29 operating the air compressor 30 for operation in the manner hereafter described in delivering compressed air to the tanks to facilitate delivery of stored materials therefrom.

Arranged rearwardly of the channel elements 11, and extending angularly downward of the channel elements 11 are the respective L-shaped channel members 31, best illustrated in FIGS. 1 and 9, fixedly secured to the respective channels 11 in a suitable manner as by welding. These channels terminate in the horizontally disposed rearwardly extending L-shaped channels 32, likewise fixedly secured thereto as by welding to form an integral structure. The respective channels 32 on opposite sides of the tank truck framework terminate in the vertically enlarged rearwardly extending rear channels 34 which are arranged in opposed relation and are of U-shape in cross section. Additional cross channels 14 of U-shape cross section interconnect spaced rear portions of the side channels 34 to complete the assembly. The assembly is substantially the same as the assembly above described in connection with cross channels 14 at the opposite end of the framework. There is an additional reinforcing structure provided, however, best illustrated in FIGS. 2 and 10 wherein opposed pairs of plates 35 overlie and are fixedly secured as by the welds 35' to top and bottom portions of the cross channels 14 and at the same time are fixedly secured to undersurface portions of the side channels 34 as by the welds 36, best illustrated in FIG. 10 to thus assure a more rigid structure and an additional reinforcement for the rear portion of the framework of the tank truck assembly.

Corresponding to the inclined frame elements 31 which extend downwardly, there are also corresponding oppositely inclined upwardly extending L-channels 33, FIG. 1, adapted to supportably receive lower portions 56 of conical shape of the upright tanks 55 respectively. Similar channel members 51 and 52 are integrally secured to portions of the side frame elements 32 and 34 for cradling the conical end of the second tank, as will be hereafter described.

The upright channels 37 are arranged towards the forward ends of the main frame and are secured at their lower ends as by welding as at 40, FIGS. 1 and 2 and at their upper ends have supportably mounted thereon and fixedly secured thereto the parallel spaced top channels 38 of inverted U-shape in cross section, being secured thereto as at 39, FIG. 2. There are an additional pair of upright truss supports 37 adjacent rear portions of the framework whose lower ends are secured to the side channels 34 as at points 40 as by welding. Additional reinforcing channels 41 extend angularly downward from the lower end portions of the rear supports 37, being secured to the upright supports as at 42 and secured to portions of the channel 34 as at points 43, as by welding to thus provide a rigid structure.

Referring particularly to FIGS. 1 and 2 there are provided formed side plates which depend from and are suitably secured to opposite sides of the top channels 38 being generally indicated at 44 and including the depending end members 47, the upwardly curved pairs of side members 45 with the central depending portion 46.

These side plates 44 are important in completing the assembly which effectively ties and rigidly integrates the tanks with respect to the truss framework as will be hereafter explained.

Referring to FIGS. 1 and 2 there are a pair of upwardly and rearwardly inclined truss-type channels 48 which respectively interconnect the bottom channels 11 and the forward ends of the top channels 38, with the respective upper ends of the channels 48 fixedly secured between the side plates 44 by welding as at 49. The respective lower ends of the channels 48 are fixedly secured by angle plates as at 49' to portions of channels 11, there being additional angle members 50 to fixedly secure the lower end portions of the inclined channels 48 to side members of the respective channels 11 completing this assembly.

Referring to FIGS. 1 and 9, portions of the side members of the angular channels 31 may have upright extensions 31' fixedly secured thereto as by welding as shown in FIG. 9, so as to cooperatively engage the inclined spacer plates 54 which are fixedly secured as by welding to exterior portions of the outer walls of the conical elements 56 forming a part of the tanks 55. These spacer plates thus reinforce the tanks at their point of contact with the upper edges of the respective channels 31—31' and are fixedly secured thereto throughout their line of contact as by the welds 55 best shown in FIG. 9.

The spacer plates 54 are themselves fixedly secured to exterior wall portions of the conical part of the tanks 56 by a series of continuous welds 57, as shown in FIG. 1.

The upright wall portions of the cylindrical part of the respective tanks 55 engage interior portions of the upright supports 37 and are fixedly secured thereto by a series of substantially continuous welds 58. In this connection also upright side portions of the respective cylindrical portions of the tanks have fixedly secured thereto by welding the upright spacer or reinforcing plates 61, as shown in FIG. 12 for illustration.

The upright truss-like plates 59 are arranged on opposite sides of the respective tanks 55 so as to engage adjacent upright side portions thereof and are fixedly secured to corresponding spacer plates 61, upon the said tanks as by the welds 58 best shown in FIG. 12. The upper ends of the respective plates 59 on opposite sides of the assembly engage the central depending support members 46 of the side plates 44 which depend from the top channels 38.

The lower ends 54' of the of the respective upright plates 59 engage and are suitably secured to the corresponding angular inclined bottom channel supports 33 and 51, which form a part of the truss assembly to thus provide a completely integrated unit, and wherein it is noted that the upper arcuate portions of the tank tops 56' likewise have spacer plates 80, FIG. 11 for cooperative engagement with the side plates 44, being fixedly secured thereto as by the continuous welds 60, which is in the nature of a seam weld to provide a unit structure.

The outline of the respective tanks is generally indicated at 62, FIG. 1, as it is integrated within the truss frame assembly. At all points of contact of the respective tanks 55, their conical bottoms 56 and their curved tops 56' there are provided reinforcing spacer plates along the edge portions of the respective tank elements where they cooperatively engage and are fixedly secured to portions of the truss frame assembly.

These plates are specifically the bottom plates 54, FIGS. 1 and 9, the upright plates 61, FIGS. 2 and 12 and the top plates 80, best illustrated in FIG. 11. Accordingly where there are increased stresses due to the weight of the tank where it engages the truss members or frame, suitable spacer plates are interposed and fixedly secured into the integral assembly.

As shown in FIG. 1, the conical bottom portions of the respective tanks extend slightly below the frame elements 32–34, as at 63 and terminate in the lateral outlets 64, which of course are arranged adjacent the bottom of the respective tanks. Panel plates 65 are arranged on opposite sides of the assembly interposed and suitably secured as by welding to portions of the respective base channels 32 and the inclined channels 33 and 51 and at their periphery respectively close the openings which normally occur between the respective angular tank supporting channel elements and the base frame 32, thus completing the assembly.

Mounted upon the panel plate 65 of which there are preferably two, one on each side of the assembly, there are provided a series of valve assemblies generally indicated at 66 which serve as control mechanisms for distributing compressed air as delivered from the compressor 30 in a conventional manner to the respective lower ends of the tanks 55 as to the respective intakes 83 shown in FIG. 3 by which air under pressure is directed to and through and upwardly of the substance stored within the tanks to facilitate its movement out through the respective outlets 64, of course under the control of the valves 79, shown in FIG. 3.

On the tops of the tanks there are provided suitable closures generally indicated at 71 by which the respective tanks are filled in a conventional manner.

There is still an additional pair of reinforcing truss-like compression members, namely the upwardly and inwardly inclined rear channels 67 which at their upper ends are fixedly secured at 68 as by welding to rear portions of the top channels 38, and at their lower ends are fixedly secured as by welding at 69 to portions of the rear ends of the rearwardly extending channels 34. A series of grille type steps 70 are respectively interposed in a conventional manner between the angular compression channels 67 to provide means of climbing to the top of the respective tanks, as desired.

There is thus provided an integral framework within which the respective tanks are nested and fixedly secured throughout all points or lines of contact. The respective compression members are indicated by the capital letter C and the tension members by the capital letter T to indicate the characteristics of the truss-like frame assembly for the respective tanks which forms a part of the trailer, including the conventional wheels, indicated at W, and with he forward end of the trailer adapted for connection with the conventional driving tractor through the kingpin 27 and kingpin plate or fifth wheel 26.

Referring to FIG. 2 the covers 71 for the respective tanks include the circular elements 72 normally adapted to close intake openings in the tops of the tank elements 56', being hingedly connected with the tank tops as at 73. A plurality of holddown arms 74 are pivotally connected at 75 to spaced portions of the tank body upon the exterior of the cover element 72. Their inner ends project radially inward so as to overlie and retainingly engage the central top portion of the cover element 72 and are fixedly retained in the position shown by means of the upright shaft 76 forming a part of the cover over which is threadedly secured the retaining plate 77 carrying the handle 78. This provides an effective means of locking or clamping down the cover elements 72 with respect to the tank tops.

Referring to FIG. 3 there is shown the structure of the aerator which is employed to facilitate the delivery under pressure, i.e., air pressure of the finely divided particles of material stored within the tanks normally in a dry form. It is contemplated, however, that liquids could be stored within the tanks or semi-liquid materials.

Assuming, however, that materials of a dry powdery form are stored within the tanks the present aerator operates so as to facilitate delivery of material through the outlet 64 under the control of the valve 79 and to thus be able to deliver the material to a relatively high point in view of the power supplied to the material from the air pressure delivered through the compressor 30 and the control assembly 66 shown in FIG. 1.

The present aerator includes a perforated inclined metal plate 81 at the bottom of the tank, tapered downwardly so as to register at its lower end with the respective outlet 64. Mounted above the perforated metal support is a suitable fabric of cotton duck 82, for illustration, which is of sufficient porous character as to permit air under pressure to move upwardly into the interior of the tank, but is at the same time of such mesh as to prevent the particles of stored material from passing through the fabric.

Air under pressure enters the tank at intake 83 below the perforated plate 81 moves upwardly through the fabric 82 thus aerating the stored material and facilitating its delivery under pressure and through the outlet 64.

Auxiliary air is also supplied to the outlet 64 as by virtue of the intake pipe 84, FIG. 3 which is also connected to the source of compressed air and which is arranged eccentrically with respect to the axis of outlet 64 and thus deliver and produce a swirling or spiral effect to the material, as it flows through the outlet 64.

A slightly different form of aerator assembly is shown in FIGS. 4, 5 and 6. This aerator generally indicated at 85, FIG. 5 is adapted for mounting upon the bottom portion of the tank, includes the supporting framework 86 of annular shape and the curved bottom wall 87 actually defining the bottom wall of the tank. A suitable fabric of cotton duck, or the like, is stretched over the bottom portion of the tank, being inclined upwardly as shown at 88 in FIG. 5 in spaced relation to the air inlet 83, adapted to receive compressed air.

The outer peripheral portions of the fabric 88 are fixedly secured to portions of the annular support as at points 89 to extend around the upper edge of the said aerator assembly. The holddown strip 90 effectively secures a portion of the fabric to the bottom interior wall of the aerator assembly 87, employing a series of suitable fasteners 91 so as to maintain portions of the fabric 88 below and so as not to interfere with the outlet 93 for the outlet pipe 92 which converges inwardly towards the exterior of the tank extending laterally outward therefrom and merging with the outlet pipe 94 under the control of a suitable valve 95.

Portions of the strip of material 88 overlie the bottom wall portions of the tank bottom 87 and adjacent the tapered delivery pipe 92 extend upwardly as at 96, FIG. 4 and over the top thereof, as indicated at 97 to complete the assembly of the strip of perforated fabric material through which air under pressure is delivered to the contents upon the interior of the tank for the purpose of facilitating outward flow thereof through the outlet pipe 94, valve 95, and the outlet 99, of course, under the control of a conventional valve 95.

It is noted also that a portion of the fabric overlies the inner intake portion of the passage member 92 and is held down and secured thereto by the holddown strip 98, FIGS. 4 and 5.

An auxiliary source of compressed air is also provided adjacent the outlet end of the pipe 94 being generally indicated at 100 with inlet 101. Here also the said auxiliary air supply pipe 100 is arranged off center or eccentric with respect to the longitudinal axis of the pipe 94 so as to produce a spiralling effect upon the material as it is delivered to the outlet pipe and to thus facilitate in the delivery of the material and the maintaining of the same in its finely divided particle arrangement and prevent the accumulation of clumps thereof.

Cover 72, FIG. 2, is concave and is formed like a spout 102 adjacent the hinge 73 so that the water collected therein will be poured off of the cover when it is opened. This prevents water from dropping into the tank.

It will be understood that the present tank truck assembly may include a single tank.

Having described the invention, reference should now be had to the following claims.

We claim:

1. In a vehicle for carrying bulk, granular or other material, a pair of upright parallel longitudinally extending frame elements with opposed pairs of transverse apertures therethrough, means laterally interconnecting the frame elements, a series of upright tanks centrally mounted within said frame elements with spaced portions of each tank extending transversely outwardly through a corresponding pair of apertures, the sides, top and bottom portions of each tank on opposite sides in vertical planes throughout their height cooperatively engaging portions of said frame elements respectively throughout a line of continuous engagement, and means rigidly securing said tanks throughout said engaging surfaces to corresponding surfaces of said frame elements defining a unit integrated structure; each frame element including a continuous bottom channel, a coplanar continuous top channel spaced thereabove of reduced length, a pair of longitudinally spaced coplanar upright truss-like members respectively secured at their upper ends to the ends of said top channel and at their lower ends to intermediate portions of said bottom channel, downwardly and outwardly inclined end truss-like channels with their respective ends secured to the respective corresponding ends of said top and bottom channels, the bottoms of said apertures in said frame elements including coplanar upwardly and outwardly extending channels, the lower ends of said tanks being conical in form for cooperative engagement with said latter channels, and a pair of upright compression plates secured along and depending from opposite sides of each top channel of said frame elements and secured to adjacent upright and inclined truss-like channels, under portions of each of said plates being curved for cooperative engagement with top surfaces of each of said tanks.

2. In a vehicle, two longitudinally spaced upright cylindrical tanks having domed tops and conical bottoms; a frame having two parallel side trusses spaced apart less than the diameters of the tanks and extending from well below to well above the tanks; each truss having upper and lower horizontal longitudinally extending elements and three longitudinally spaced upright elements, an intermediate one between the two tanks and outer ones outside the tanks; the two horizontal elements and the three upright elements together defining two longitudinally spaced openings, with each opening containing an outwardly projecting bulged side of a tank in continuous line engagement with and there welded to the peripheral continuous edge of the opening; with the bottoms of the tanks resting on the lower horizontal elements, the tops of the tanks being engaged by the upper horizontal elements in compression, and the sides of the tanks being engaged by the upright elements; the latter having filling openings in the domed tops between the side trusses and also having discharge openings in the conical bottoms between the side trusses, cross braces connecting the side trusses; the upper horizontal elements of the side truesses terminating at the outer uprights; the lower horizontal elements extending well beyond the outer uprights; and angle braces connecting the ends of the lower horizontal elements and the ends of the upper horizontal elements.

References Cited in the file of this patent

UNITED STATES PATENTS

| | | |
|---|---|---|
| 337,828 | Gathright | Mar. 16, 1886 |
| 425,517 | Hughes | Apr. 15, 1890 |
| 998,120 | Proelss et al. | July 18, 1911 |
| 1,685,105 | Thompson et al. | Sept. 25, 1928 |
| 1,872,272 | Furrer | Aug. 16, 1932 |
| 2,022,324 | Schock | Nov. 26, 1935 |
| 2,169,500 | Reid | Aug. 15, 1939 |
| 2,285,543 | Thomas | June 9, 1942 |
| 2,690,352 | Turner | Sept. 28, 1954 |
| 2,694,496 | Atkinson | Nov. 16, 1954 |
| 2,721,006 | Knutsen | Oct. 18, 1955 |
| 2,901,133 | Weller | Aug. 25, 1959 |
| 2,929,658 | Killebrew | Mar. 22, 1960 |
| 2,930,512 | Paton | Mar. 29, 1960 |

FOREIGN PATENTS

| | | |
|---|---|---|
| 526,245 | Italy | Mar. 16, 1955 |